(12) United States Patent
Skull et al.

(10) Patent No.: US 9,765,923 B2
(45) Date of Patent: Sep. 19, 2017

(54) CLEAT MOUNT WITH VISUAL AND AUDIBLE INDICATOR

(71) Applicant: Milestone AV Technologies LLC, Eden Prairie, MN (US)

(72) Inventors: Joseph Skull, Fridley, MN (US); Robert Hagen, Minneapolis, MN (US); Ben Streiff, Eden Prairie, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 0 days.

(21) Appl. No.: 15/027,427

(22) PCT Filed: Oct. 9, 2014

(86) PCT No.: PCT/US2014/059877
§ 371 (c)(1),
(2) Date: Apr. 5, 2016

(87) PCT Pub. No.: WO2015/054480
PCT Pub. Date: Apr. 16, 2015

(65) Prior Publication Data
US 2016/0245457 A1  Aug. 25, 2016

Related U.S. Application Data

(60) Provisional application No. 61/888,920, filed on Oct. 9, 2013.

(51) Int. Cl.
*A47G 1/16* (2006.01)
*H04N 5/64* (2006.01)
(Continued)

(52) U.S. Cl.
CPC ........... *F16M 13/02* (2013.01); *A47B 97/001* (2013.01); *F16B 1/0071* (2013.01); *G06F 1/16* (2013.01);
(Continued)

(58) Field of Classification Search
CPC ....... F16M 13/02; A47B 97/01; F16B 1/0071; G06F 1/16; H05K 5/0017; A47G 1/1606;
(Continued)

(56) References Cited

U.S. PATENT DOCUMENTS 3,955,790 A * 5/1976 Ballin .................. A47G 1/1606
248/489
4,228,982 A * 10/1980 Sellera ................. A47G 1/1606
248/467

(Continued)

FOREIGN PATENT DOCUMENTS

KR  10-2009-0099290 A  9/2009
KR  10-2011-0071547 A  6/2011

OTHER PUBLICATIONS

International Preliminary Report on Patentability for International Application No. PCT/US2014/059877, filed Oct. 9, 2014, mailed Apr. 21, 2016 (6 pgs).

(Continued)

*Primary Examiner* — Tan Le
(74) *Attorney, Agent, or Firm* — Patterson Thuente Pedersen, P.A.

(57) ABSTRACT

A mount for mounting an electronic display on a wall includes a latch whereby the display interface portion of the mount can be selectively engaged and disengaged from the wall interface portion. The latch provides a positive visual and/or audible indication of when the mount is fully engaged. The mount may include a wall interface adapted to be secured to a wall or similar structure, and a display interface adapted to be secured to an electronic display. The wall interface generally includes a plurality of pairs of angled slots, each pair of angled slots having a different angle than the other pairs. The slots are adapted to receive fasteners which secure the wall interface to the wall, as well (Continued)

as enable adjustment of the tilt of the bracket so as to ensure the bracket is level.

20 Claims, 13 Drawing Sheets

(51) Int. Cl.
    *H04N 5/655*     (2006.01)
    *F16M 13/02*     (2006.01)
    *G06F 1/16*     (2006.01)
    *A47B 97/00*     (2006.01)
    *F16B 1/00*     (2006.01)
    *H05K 5/00*     (2006.01)

(52) U.S. Cl.
    CPC ...... *H05K 5/0017* (2013.01); *A47B 2097/005* (2013.01); *A47G 1/1606* (2013.01); *A47G 1/1613* (2013.01); *H04N 5/64* (2013.01); *H04N 5/655* (2013.01)

(58) Field of Classification Search
    CPC ........ A47G 1/1613; A47G 1/168; H04N 5/64; H04N 5/655
    USPC ......... 248/227.1, 317, 917, 475.1, 476, 489, 248/494, 224.51, 225.1, 544, 547
    See application file for complete search history.

(56) References Cited

U.S. PATENT DOCUMENTS

| | | | | |
|---|---|---|---|---|
| 4,891,897 | A | | 1/1990 | Gieske et al. |
| 5,209,449 | A | * | 5/1993 | Hart ..................... A47G 1/1633 248/475.1 |
| 5,454,542 | A | * | 10/1995 | Hart ....................... A47G 1/168 248/494 |
| 6,557,813 | B1 | * | 5/2003 | Duggan ............... A47G 1/1613 248/476 |
| 7,708,252 | B2 | * | 5/2010 | Vander Berg ........ A47B 96/027 248/475.1 |
| 2006/0266900 | A1 | | 11/2006 | May et al. |
| 2013/0048812 | A1 | | 2/2013 | Lozano |

OTHER PUBLICATIONS

International Search Report for International Application No. PCT/US2014/059877, mailed Jan. 12, 2015, 3 pages.

Written Opinion of the International Searching Authority for International Application No. PCT/US2014/059877, mailed Jan. 12, 2015, 4 pages.

* cited by examiner

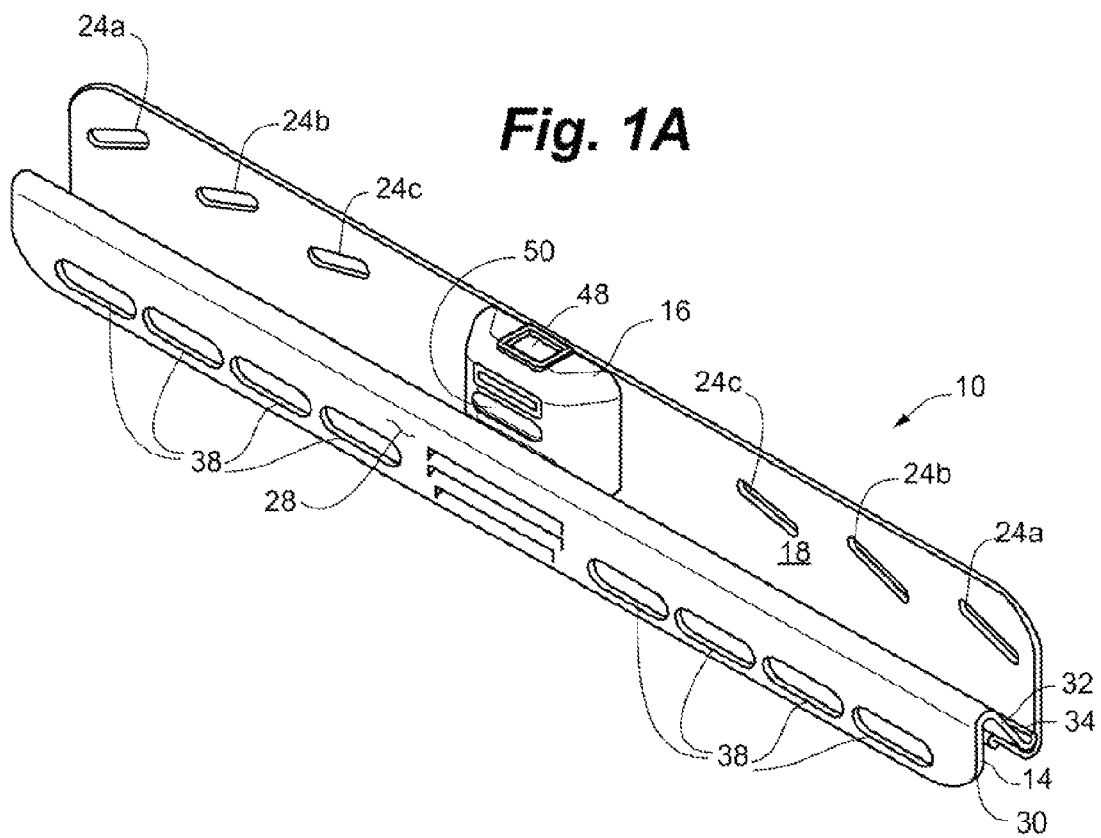

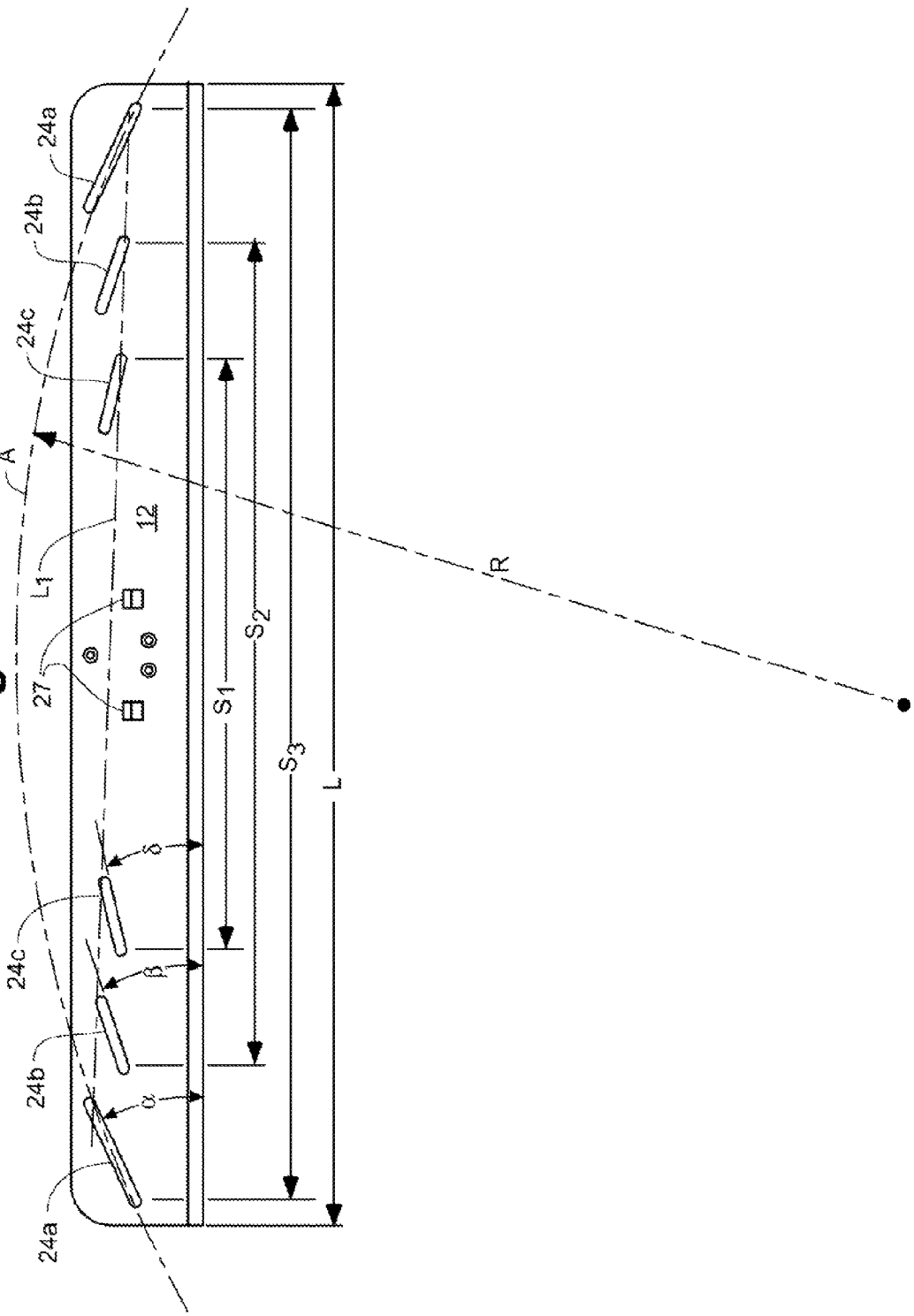

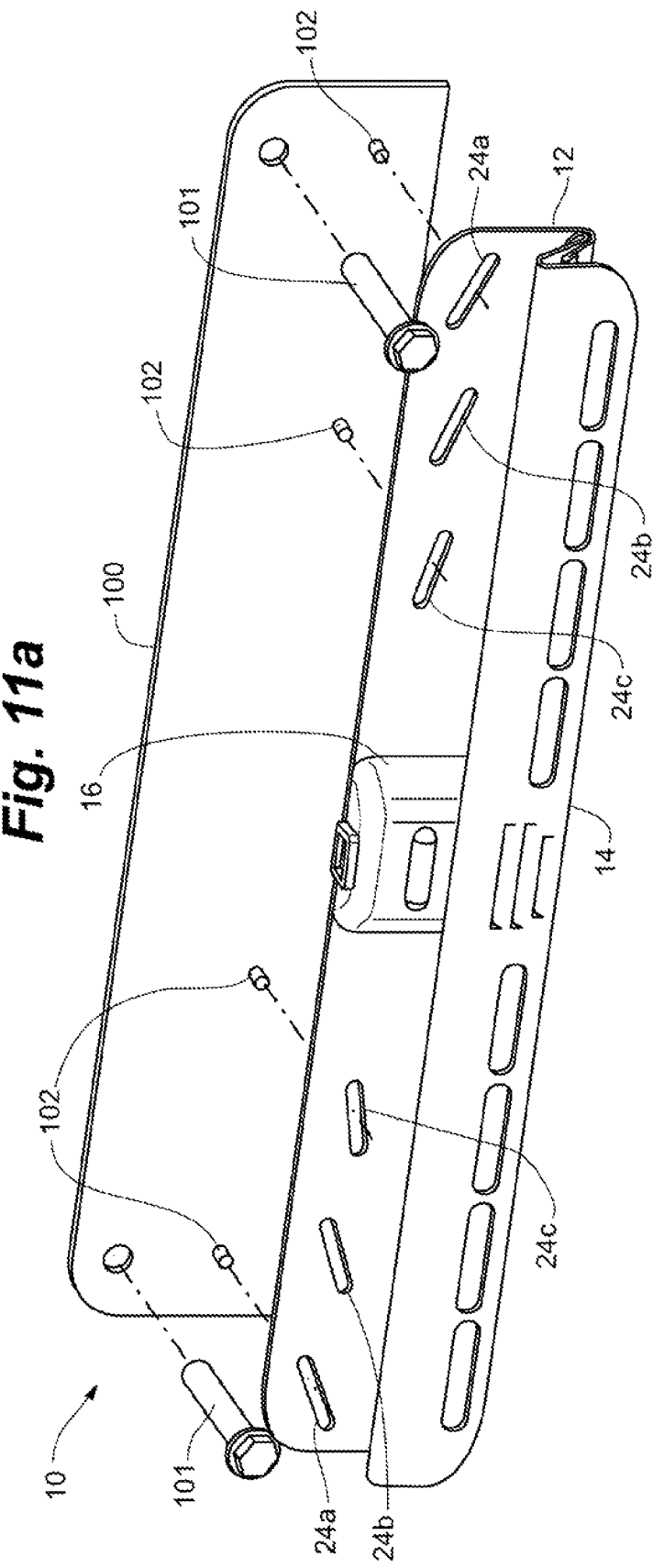

CLEAT MOUNT WITH VISUAL AND AUDIBLE INDICATOR

RELATED APPLICATIONS

The present application is a national phase entry of PCT Application No. PCT/US2014/059877, filed Oct. 9, 2014, which claims the benefit of U.S. Provisional Application No. 61/888,920, entitled LATCHING TV MOUNT WITH VISUAL INDICATION CLEAT MOUNT, filed Oct. 9, 2013 the entire disclosures of which are incorporated herein by reference.

FIELD OF THE DISCLOSURE

The present invention is generally related to mounting systems for attaching a television or monitor to a wall of a structure, and more specifically to safety features for preventing the television or monitor from becoming inadvertently disengaged from the wall.

BACKGROUND OF THE DISCLOSURE

Televisions typically comprise a large heavy display centered over a base adapted to keep the display upright. Televisions have traditionally included cathode ray tubes or projection systems that extended rearward from the face of the display, which required large bases to distribute the weight of the display. The large base helped balance the television and prevent the television from tipping over. However, in recent years, flat panel displays with relatively thin profiles have become increasingly popular and have all but replaced traditional televisions. Flat panel displays do not require the rearward extending cathode ray tubes or projection systems of traditional televisions and as a result have a very thin side profile. The thin profile of flat panel display allows a substantially smaller base to be used to support the display. However, the relatively high center of mass of the flat panel display and the small base increase the likelihood of the display tipping forward creating a substantial safety risk.

Similarly, wide screen televisions have also become increasingly popular and are quickly replacing traditional televisions with standard sized screens. Unlike standard television screens that are squarer in shape, wide screen televisions are more rectangular and can be significantly wider than tall. However, the relatively small base of flat panel displays and the wide shape of the display create a substantial risk of the television tipping over side-to-side in addition to the potential of tipping forward. The increased risk of tipping over either forward or side to side coupled with the heavy weight of the display creates a substantial risk of injury and damage to the display itself. In particular, young children can tip the display over on themselves and become trapped underneath it.

In part to minimize the risk of tipping, displays are often mounted on a wall or other fixed structure. While this alleviates the tipping risk, a problem with prior art wall mounts for displays, especially lower cost cleat mounts, is that if the display is not fully engaged on the mount, the display can become inadvertently disengaged and fall, thereby causing injury and/or damage to the display. As a result, what is needed in the industry is a mount that inhibits accidental disengagement of the display, and provides an indication to the user as to when the display is properly engaged on the mount.

Another drawback of existing display mounts is in achieving proper leveling of the mount on a wall surface during installation of the mount so that the electronic display is properly aligned on the wall. A desirable quality for flat panel display mounting devices is the ability to maintain the display in a level condition relative to the floor or ground. A level display is not only desirable from an aesthetic standpoint, but also functionally. Particularly for mounts enabling positional adjustment of the display, undesirable stresses can be placed on the mount and structure to which the mount is attached if the display is out-of-level. Also, the display can be more difficult to positionally adjust if out-of-level due to an uneven weight distribution.

Mounting devices are typically to attached to a wall or other structure using one or more mechanical fastening members. Where structural elements such as studs are advantageously positioned, lag bolts or screws are often used to fasten the mounting device to the structure. In other cases where a mount is to be fastened to drywall or plaster wall where studs are not available, toggle bolts or drywall anchors may be used.

A problem that often arises when fastening existing display mounts to a wall is that the mount will shift position slightly when the fastening members are tightened. That is, the mount is initially positioned in a level condition, but as the lag screws, toggles, or anchors are fully tightened, the mount may rotate slightly out-of-level. While the out-of-level condition is often not apparent immediately, it becomes evident once the display is attached to the mount. It is typically very difficult to reposition the mount by loosening and retightening the fastening members, since the mount tends to shift every time the fastening members are tightened. Such a trial-and-error process is often time consuming and may add to the cost of installation. Consequently, what is needed in the industry is a mount that enables faster, easier leveling of a mount and attached display.

SUMMARY OF THE DISCLOSURE

The present invention addresses the need in the industry for a mount that inhibits intentional disengagement of the display, and provides an indication to the user as to when the display is properly engaged on the mount. According to embodiments of the invention, a mount for mounting a television or monitor on a wall includes a latch whereby the display interface portion of the mount can be selectively engaged and disengaged from the wall interface portion. The latch provides a positive visual and/or audible indication of when the mount is fully engaged.

Embodiments of the present invention also address the need in the industry for a mount that enables faster, easier leveling of a mount and attached display. The mount generally includes a wall interface adapted to be secured to a wall or similar structure, and a display interface adapted to be secured to an electronic display. The wall interface generally includes a plurality of pairs of angled slots, each pair of angled slots having a different angle than the other pairs. The slots are adapted to receive fasteners which secure the wall interface to the wall, as well as enable adjustment of the tilt of the bracket so as to ensure the bracket is level.

In another embodiment, the display mount further includes a mounting plate adapted to be secured directly to a wall or other similar structure. In such an embodiment, the wall interface is secured to the mounting plate by way of a plurality of studs or standoffs or similar fasteners. Such an arrangement allows the spacing of the fasteners for the mounting plate to be easily matched to the spacing of, for example, wall studs to which the mounting plate is secured.

In an embodiment, a mount for an electronic display includes a wall interface including a planar body portion having an upwardly directed hook portion projecting therefrom, the wall interface being adapted to attach to a wall of a structure, a latch mechanism disposed on the body portion of the wall interface proximate the hook portion, the latch mechanism having a latch portion selectively shiftable between an unlatched position and a latched position, the latch mechanism further comprising a visual indicator for indicating when the latch portion is in the latched position, and a display interface comprising a display flange with a downwardly directed hook portion projecting therefrom. The display flange is adapted to attach to the electronic display. The downwardly directed hook portion of the display interface is selectively engageable with the upwardly directed hook portion of the wall interface to couple the display interface to the wall interface, and the latch portion of the latch mechanism engages with the downwardly directed hook portion of the display interface to inhibit disengagement of the display interface from the wall interface when the latch portion is shifted to the latched position.

In an embodiment, the latch mechanism further includes a biasing spring arranged to bias the latch portion toward the unlatched position, a swing catch operably coupled to the latch portion and arranged to secure the latch portion in the latched position, and a release button operably coupled to the swing catch for releasing the latch portion from the latched position. The release button can be the visual indicator. In embodiments of the invention, the release button may be disposed in a first position when the latch portion is in the unlatched position, and the release button may be disposed in a second position when the latch portion is in the latched position. Moreover, the latch mechanism may provide an audible indication when the latch portion is shifted to the latched position.

In a further embodiment, the planar body portion of the wall interface may define at least one pair of slots adapted to receive fasteners to attach the wall interface to the wall. Each of the at least one pair of slots may be disposed at an angle relative to horizontal.

In further embodiments, the planar body portion of the wall interface may define a plurality of pairs of slots adapted to receive fasteners to attach the wall interface to the wall. Each slot of the at least one pair of slots may be disposed so as to enable the wall interface to rotate relative to the wall with a separate fastener extending through each slot.

In an embodiment of the invention, an electronic display system includes an electronic display, and a mount for attaching the electronic display to a wall of a structure. The mount can include a wall interface including a planar body portion having an upwardly directed hook portion projecting therefrom, the wall interface being adapted to attach to the wall, a latch mechanism disposed on the body portion of the wall interface proximate the hook portion, the latch mechanism having a latch portion selectively shiftable between an unlatched position and a latched position.

The latch mechanism may further include a visual indicator for indicating when the latch portion is in the latched position. The mount further includes a display interface having a display flange with a downwardly directed hook portion projecting therefrom, the display flange attached to the electronic display, wherein the downwardly directed hook portion of the display interface is selectively engageable with the upwardly directed hook portion of the wall interface to couple the display interface to the wall interface.

The latch portion of the latch mechanism engages with the downwardly directed hook portion of the display interface to inhibit disengagement of the display interface from the wall interface when the latch portion is shifted to the latched position.

In embodiments of the invention, the latch mechanism may further include a biasing spring arranged to bias the latch portion toward the unlatched position, a swing catch operably coupled to the latch portion and arranged to secure the latch portion in the latched position, and a release button operably coupled to the swing catch for releasing the latch portion from the latched position. The release button may be the visual indicator. The release button may be disposed in a first position when the latch portion is in the unlatched position and a second position when the latch portion is in the latched position. The latch mechanism may provide an audible indication when the latch portion is shifted to the latched position.

In embodiments, the planar body portion of the wall interface may define at least one pair of slots adapted to receive fasteners to attach the wall interface to the wall. Each one of the at least one pair of slots may be disposed at an angle relative to horizontal.

In an embodiment of the invention, a mount for an electronic display includes a wall interface including a planar body portion having an upwardly directed hook portion projecting therefrom, wherein the planar body portion of the wall interface defines at least one pair of slots adapted to receive fasteners to attach the wall interface to a wall of a structure, a latch mechanism disposed on the body portion of the wall interface proximate the hook portion, the latch mechanism having a latch portion selectively shiftable between an unlatched position and a latched position, and a display interface comprising a display flange with a downwardly directed hook portion projecting therefrom. The display flange is adapted to attach to the electronic display. The downwardly directed hook portion of the display interface is selectively engageable with the upwardly directed hook portion of the wall interface to couple the display interface to the wall interface, and the latch portion of the latch mechanism engages with the downwardly directed hook portion of the display interface to inhibit disengagement of the display interface from the wall interface when the latch portion is shifted to the latched position. Each one of the at least one pair of slots may be disposed at an angle relative to horizontal.

In an embodiment, the planar body portion of the wall interface defines a plurality of pairs of slots adapted to receive fasteners to attach the wall interface to the wall. Each slot of the at least one pair of slots may be disposed so as to enable the wall interface to rotate relative to the wall with a separate fastener extending through each slot.

BRIEF DESCRIPTION OF THE FIGURES

The invention can be completely understood in consideration of the following detailed description of various embodiments of the invention in connection with the accompanying drawings, in which:

FIG. 1A is a front isometric view of the mount of FIG. 1;

FIG. 11 is a front elevation view of the wall interface of the mount of FIG. 1, depicting aspects of the leveling feature of embodiments of the invention; and FIG. 11a is an isometric view of an alternative embodiment of a mount according to the invention.

Figure 1:
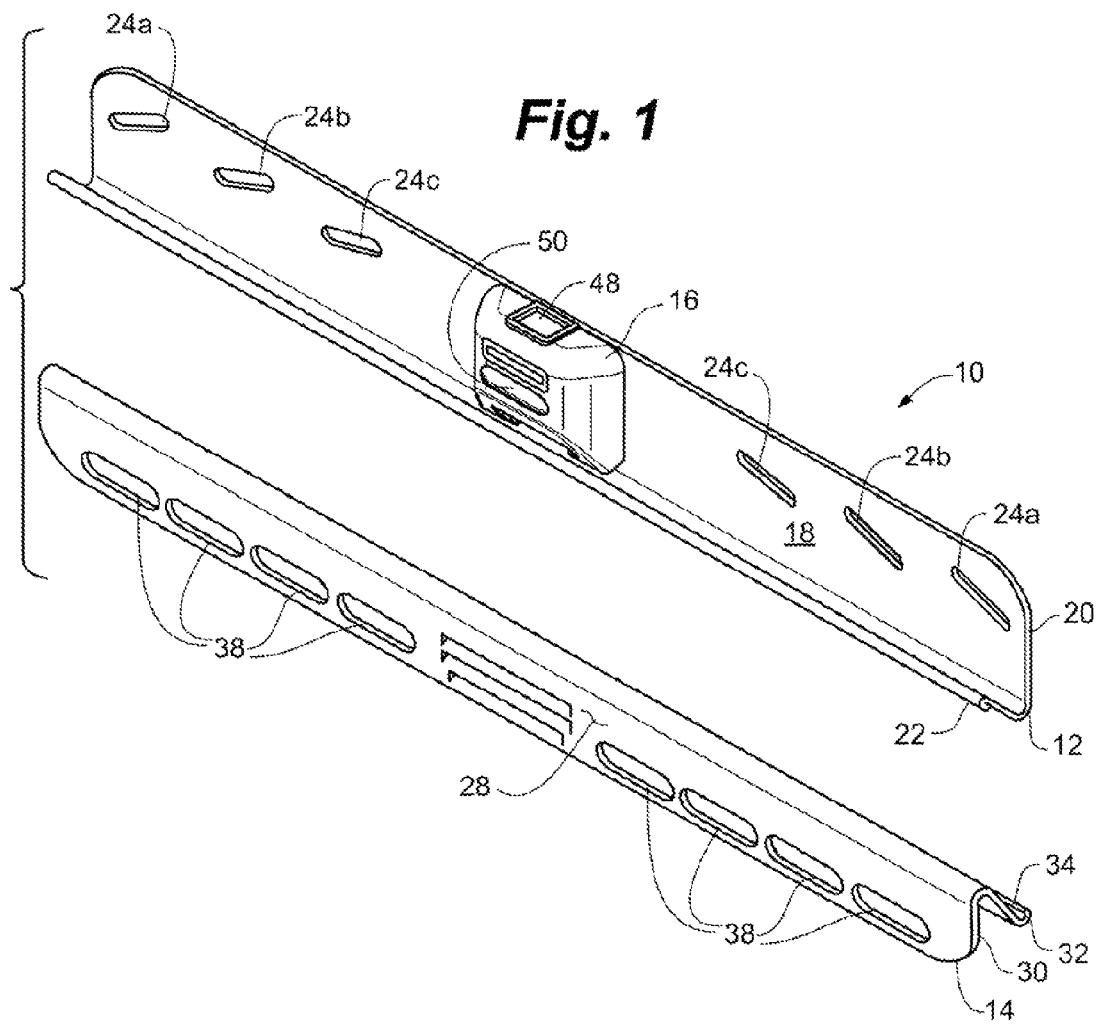
FIG. 1 is a front isometric, exploded view of a mount according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

In FIGS. 1-11 there is depicted an embodiment of a mount according to an embodiment of the invention. Mount 10 generally includes wall interface 12, display interface 14, and latch 16.

Figure 2:
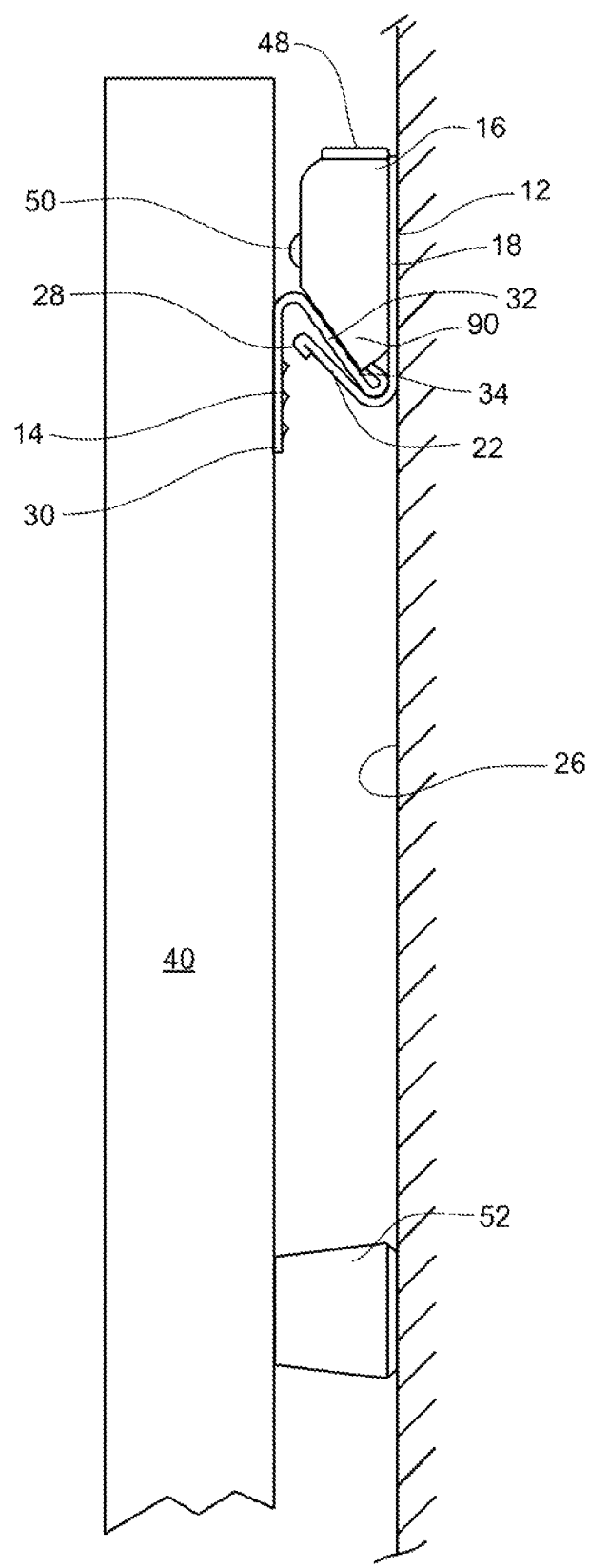
FIG. 2 is a side elevation view of the mount of FIG. 1, with an attached electronic display and mounted on a wall.
Figure 3:
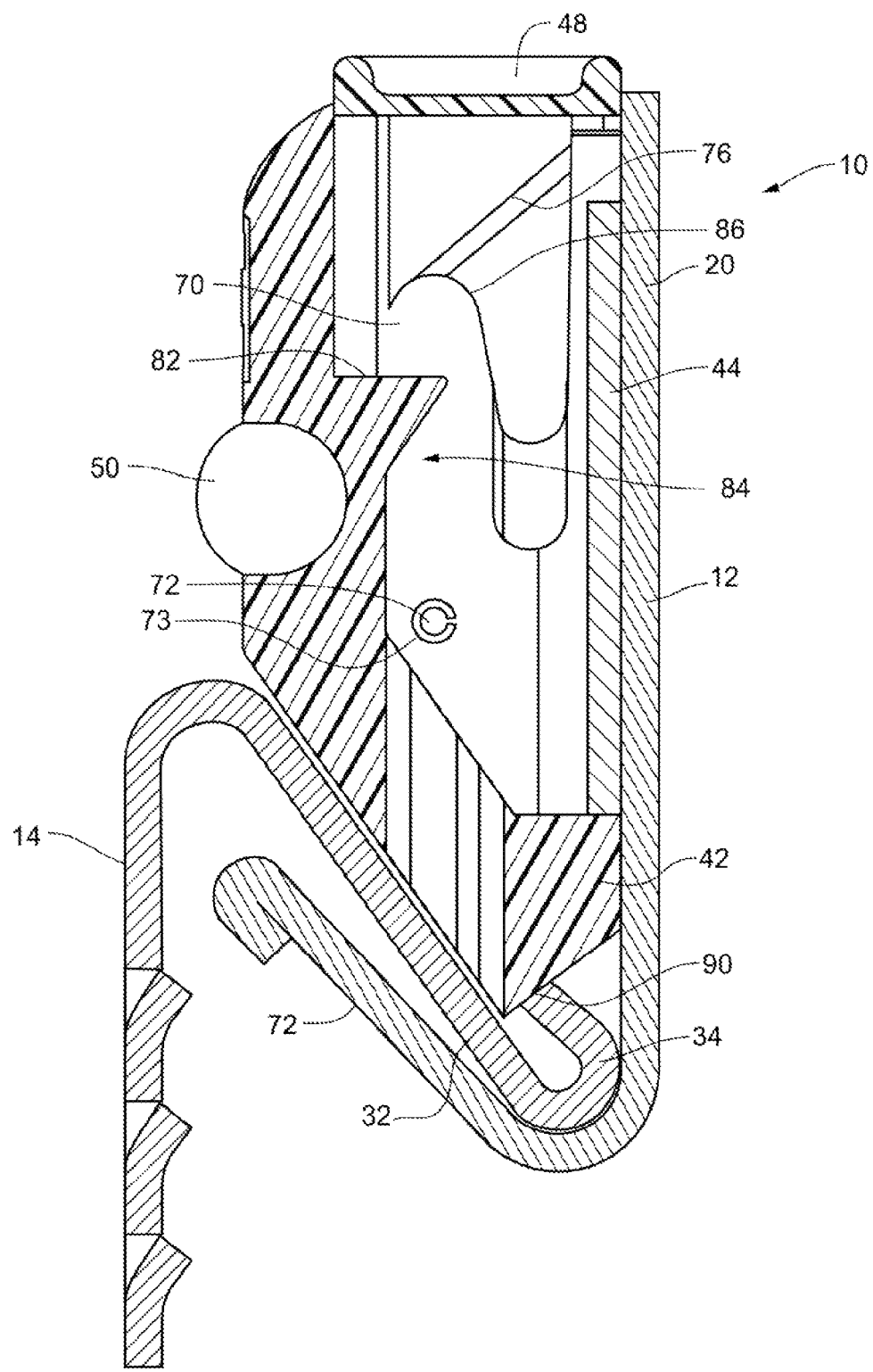
FIG. 3 is a cross sectional view of the mount of FIG. 1, taken at section 3-3 of FIG. 1.
Figure 4:
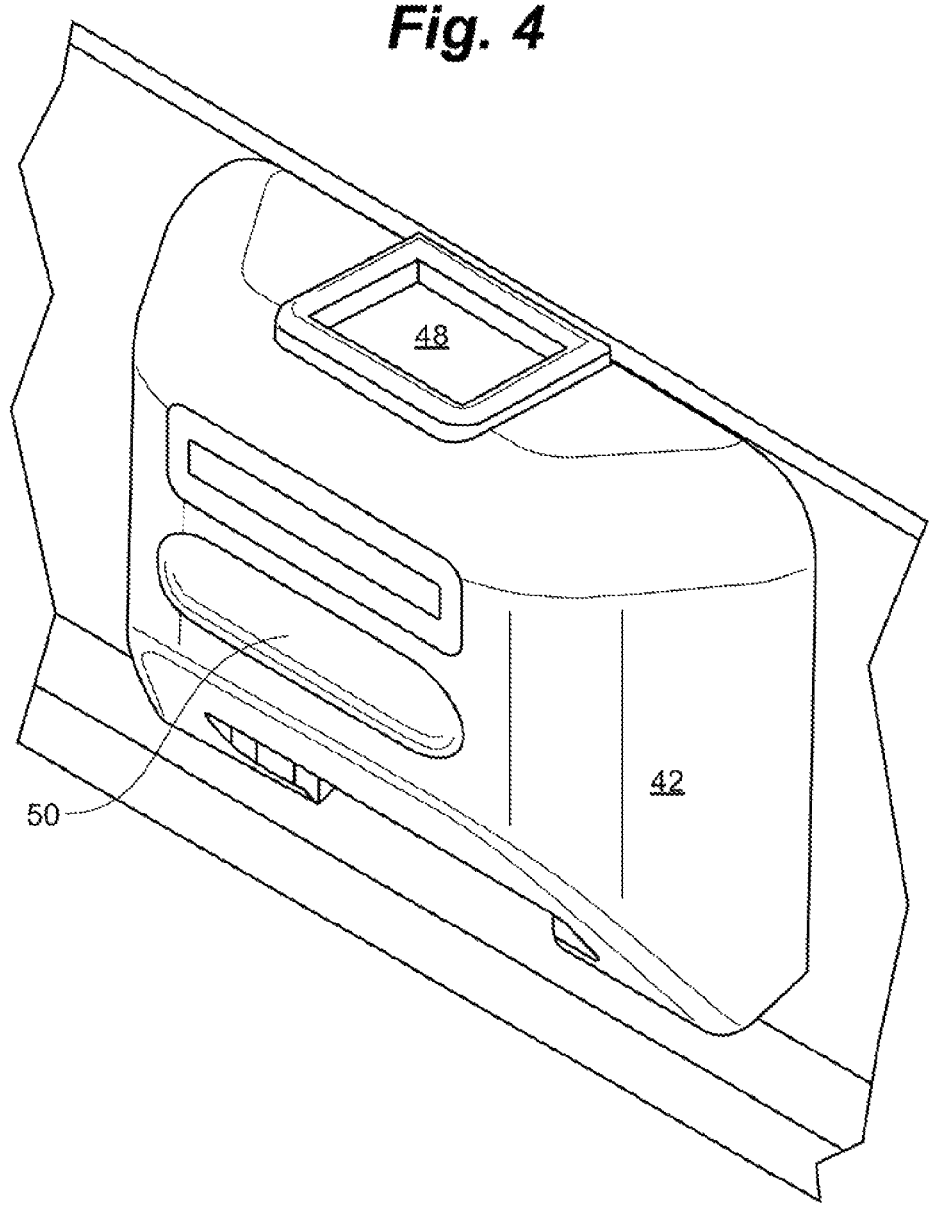
FIG. 4 is a fragmentary front isometric view of the latch portion of the mount of FIG. 1.
Figure 5:
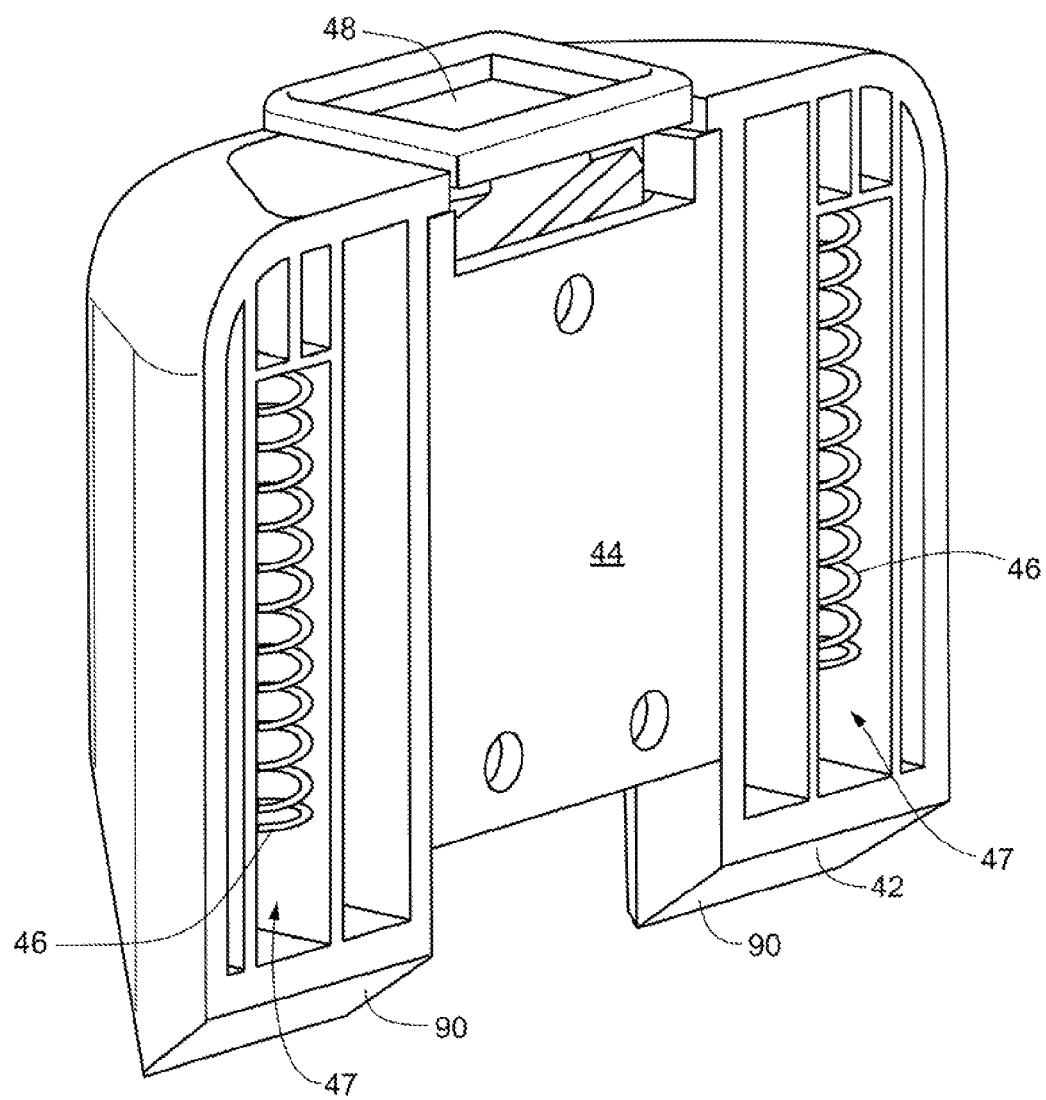
FIG. 5 is a rear isometric view of the latch portion of the mount of FIG. 1 with the wall interface and display interface omitted for purposes of clarity.
Figure 6:
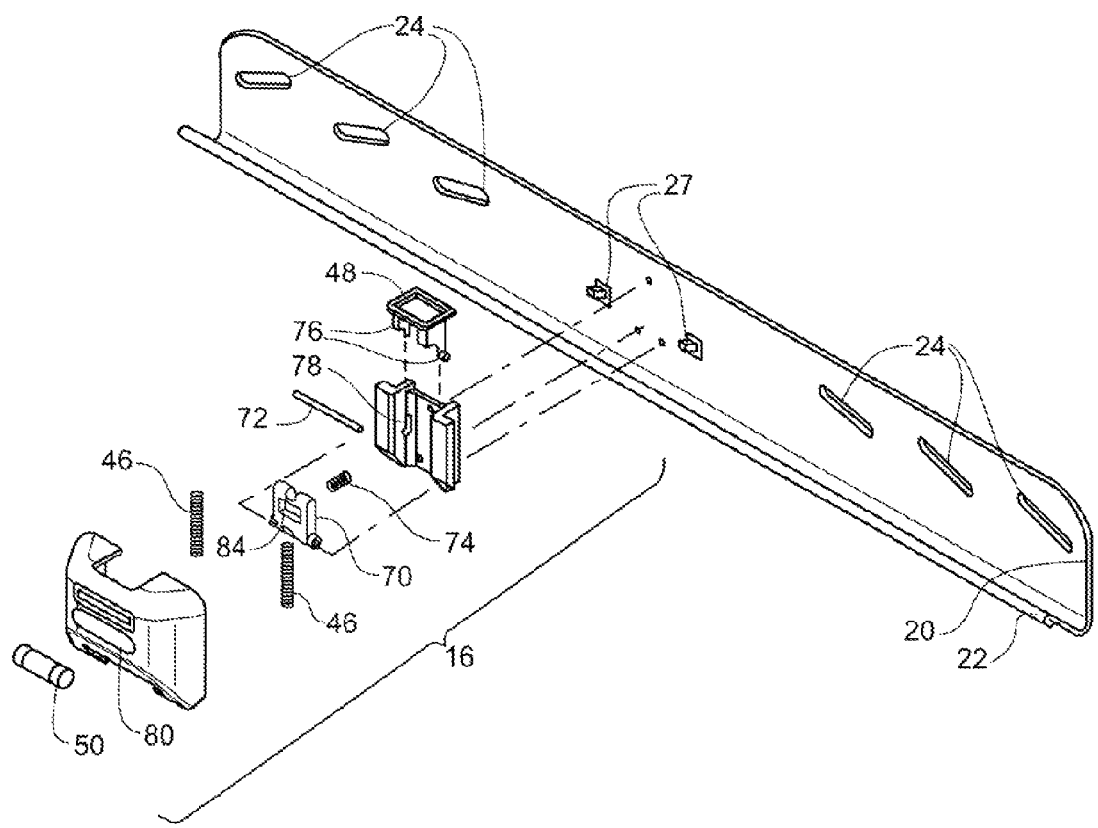
FIG. 6 is an exploded view of the wall interface and latch of the mount of FIG. 1.
Figure 7:
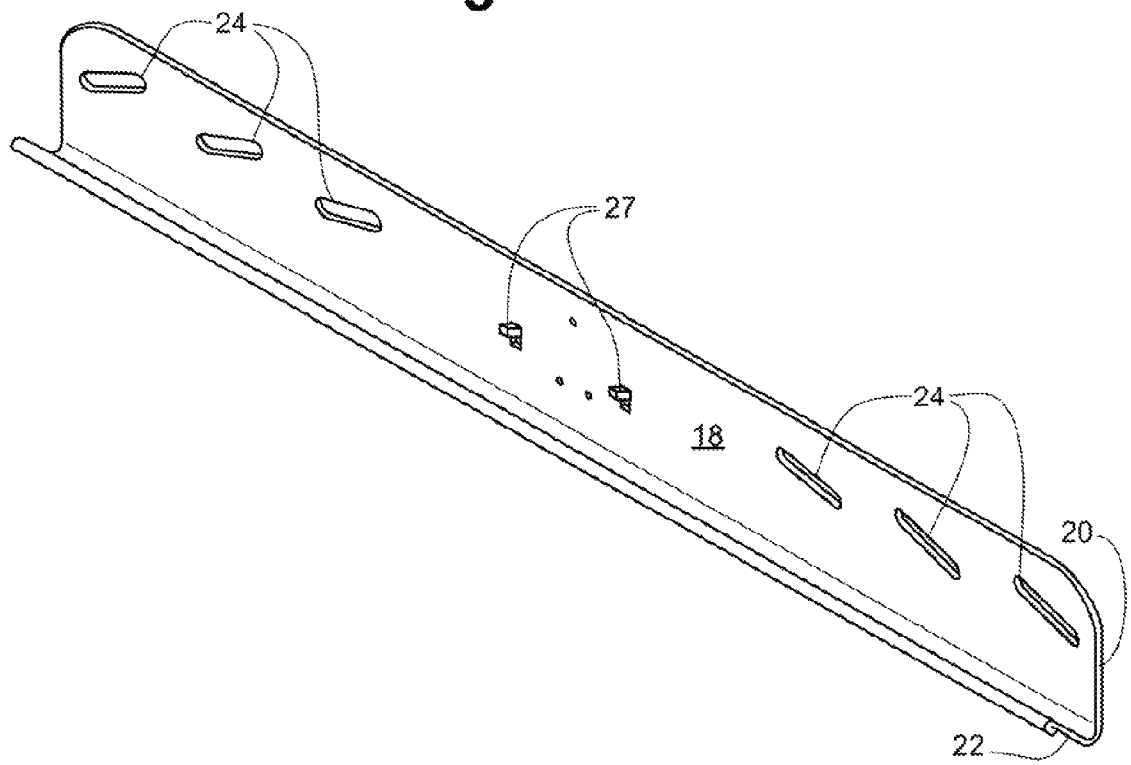
FIG. 7 is a front isometric view of the wall interface of the mount of FIG. 1.
Figure 8:
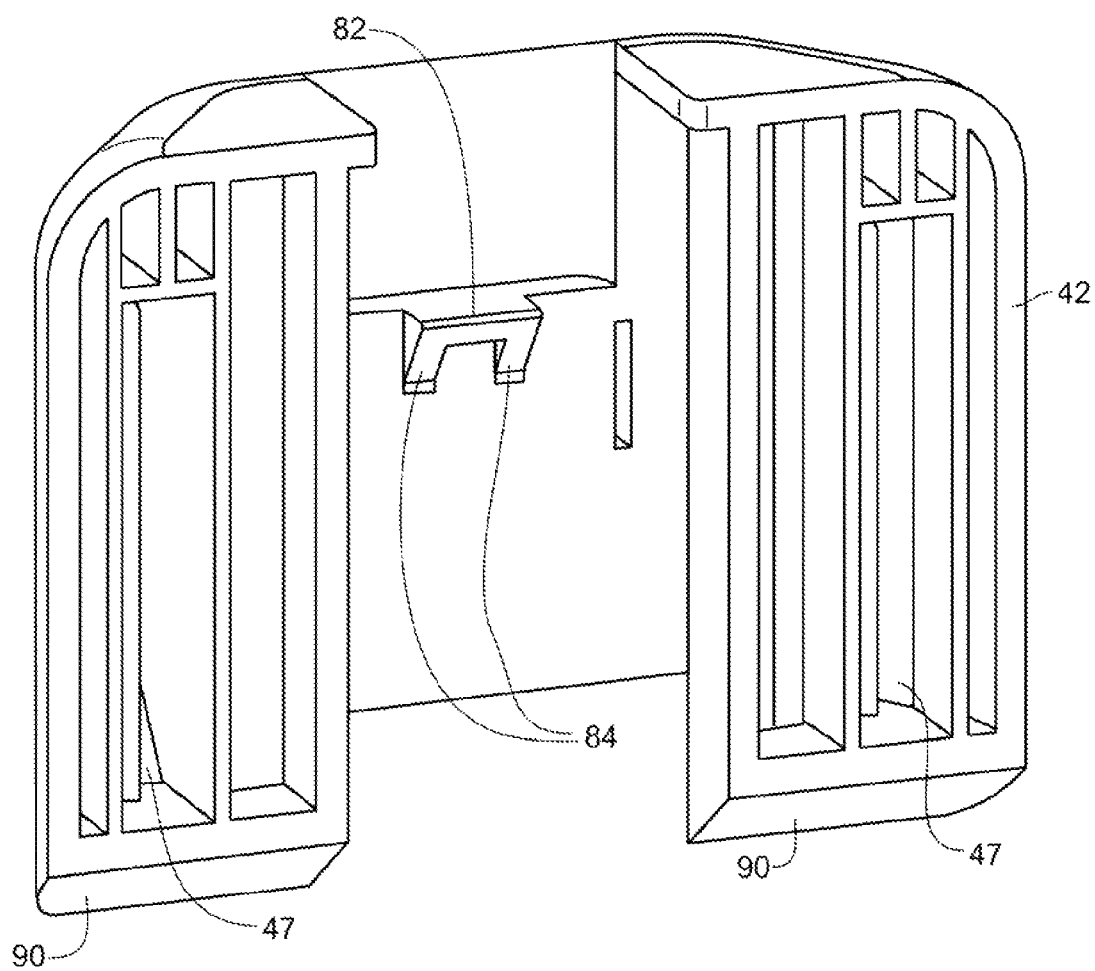
FIG. 8 is a rear isometric view of the body portion of the latch of the mount of FIG. 1.
Figure 9:
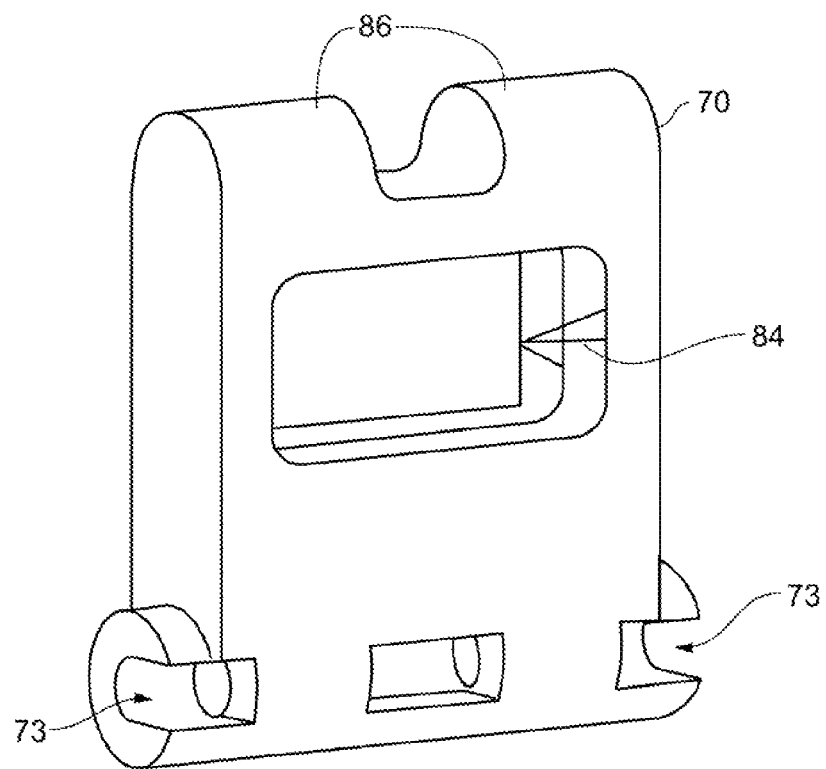
FIG. 9 is an isometric view of the swing latch portion of the latch mechanism of the cleat mount of FIG. 1.
Figure 10:
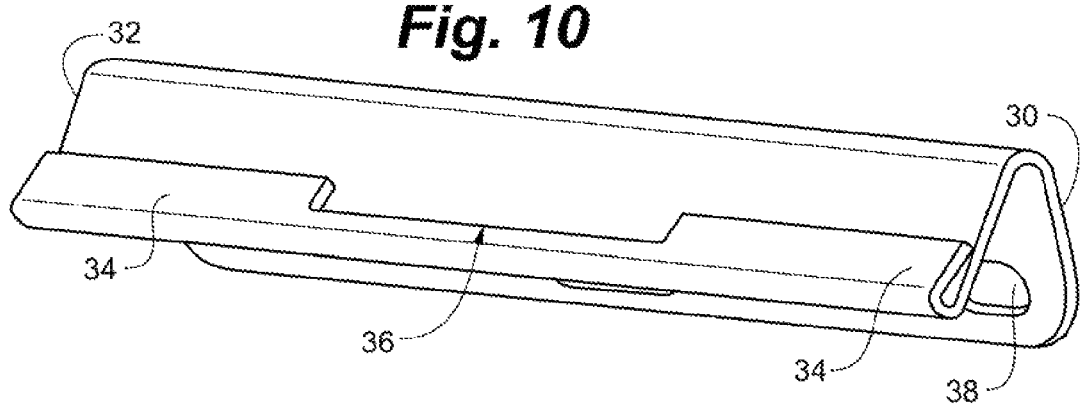
FIG. 10 is a rear isometric view of the display interface portion of the mount of FIG. 1.

Wall interface 12 generally includes body portion 18 having wall flange portion 20, and upwardly directed hook portion 22. Wall flange portion 20 defines paired slots 24a, 24b, 24c, for receiving fasteners to attach wall interface 12 to a wall 26 of a structure as depicted in FIGS. 2 and 11, and further defines spring-receiving projections 27 as depicted in FIGS. 6 and 7.

Referring now to FIG. 11, it will be appreciated that paired slots 24a, 24b, 24c are angled, with the slots on the right side of wall interface 12 as depicted being mirror images of the slots on the left side. Slots 24a are positioned at a slightly greater angle α relative to the horizontal than slots 24b, and slots 24b are positioned at a slightly greater angle β relative to the horizontal than slots 24c, which are positioned at angle γ. Each slot pair 24a, 24b, 24c can intersect the arc of a circle A having radius R, with the center of circle A generally defining a center of rotation P about which the wall interface may rotate when being positioned. Moreover, the orientation of the pairs of slots is such that a line $L_1$ can be drawn through the uppermost portion of the slots on one side of wall interface 12 through the lowermost portion of the slots on the other side of wall interface 12. It will be appreciated that the configuration of slots 24a, 24b, 24c, is such that wall interface 12 can be rotated to be made level, even with the use of three or more fasteners. In an exemplary embodiment, angle α can be about 25°, angle β about 20°, and angle γ about 14°, with the overall length dimension of wall interface 12 being about 490 mm, and slot spacings $S_1$, $S_2$, $S_3$, being about 250, 350, and 450 mm, respectively.

Although the Figures depict three pairs of slots 24a, 24b, 24c, other arrangements and numbers of slot pairs are within the scope of the invention and may be varied as necessary, for example additional pairs of slots may be added to accommodate larger, heavier displays and more flexibility in locating fasteners to attach wall interface 12 to a wall, while fewer slots may be satisfactory for smaller, lighter displays. The spacing of at least one of the slot pairs may be selected so as to conform to common spacing of wall studs, for example twelve-inch, sixteen inch, or twenty-four inch spacing as may be used in various circumstances. Moreover, although slots 24a, 24b, 24c, are depicted as straight, it will be appreciated that other slot shapes can be employed in some embodiments, including an arcuate shape.

Display interface 14 generally includes body portion 28 having display flange portion 30 and downwardly directed hook portion 32. Hook portion 32 may include rolled edges 34 and central cutout 36. Display flange portion 30 defines apertures 38 for receiving fasteners to attach display interface 14 to a television or monitor 40.

Latch 16 may be generally similar to a common automotive seat belt latch mechanism and generally includes body portion 42 which is slidably disposed on back plane 44. Compression biasing springs 46 fit within spring cavities 47 of body portion 42, and bear against spring-receiving projections 27 on wall interface 12. Springs 46 generally bias body portion 42 in a upward direction relative to back plane 44. Swing catch 70 is pivotally coupled to back plane 44 with pin 72 through apertures 73, and compression spring 74 biases swing catch 70 outwardly from back plane 44. Latch button 48 is slidable relative to back plane 44, with projections 76 guided in vertical slots 78. Body portion 42 defines projection 82 on its rear side, and beveled surfaces 84 are provided on the bottom side of projection 82. Swing catch 70 defines recess 84 and rounded surfaces 86 at its top edge.

Latch 16 is attached to wall interface 12 as depicted in FIG. 1. Latch button 48 provides a means of unlatching the mechanism, and also can provide a visual indication of the latched or unlatched status of the mechanism as will be described in more detail hereinbelow. Level 50 can be provided in cavity 80 in the front of body portion 42 to assist a user in ensuring that wall interface 12 is properly leveled on wall 26 when the mount 10 is installed.

In use, wall interface 12 is attached to a wall 26 with fasteners through selected one of slots 24a, 24b, 24c, and wall interface is leveled using level 50, and the fasteners tightened to secure wall interface 12 to the wall. Whenever additional leveling adjustments are necessary, one or more fasteners holding wall interface 12 to the wall may be loosened, enabling the fasteners to slide in slots 24a, 24b, 24c, and wall interface 12 to rotate generally about point P until leveled. Display interface 14 is attached to television or monitor 40 with fasteners through apertures 38. Standoff legs 52 can be attached to television or monitor 40 near the bottom edge of the device. Display interface 14 is engaged with wall interface 12 by hooking downwardly directed hook portion 32 of display interface 14 over upwardly directed hook portion 22 of wall interface 12. With display interface in position, body portion 42 of latch 16 can be slid downward, so as to engage latch portions 90 behind hook portion 32 of display interface 14. Swing catch 70 is urged outward by the bias of spring 74 so that projection 82 engages in recess 84, thereby locking body portion 42 so as to inhibit display interface 14 from being disengaged from wall interface 12.

Those of skill in the art will appreciate that display interface 14 and the attached display 40 can be slid from side-to-side in this position, due to the clearance provided by central cutout 36, limited only by rolled edges 34. When latched, latch button 48 pops-up above the top surface of body portion 42, so as to provide a visual indication that the latch is fully engaged. It will be appreciated that latch button 48 can be made to have a contrasting color from body portion 42, so as to provide a further visual indication, easily distinguishable from a distance. Moreover, it will also be appreciated that in other embodiments, further visual distinguishing cues can be provided according to embodiments of the invention, such as LED lights to indicate the latched or unlatched status of the mechanism, with the addition of switches and appropriate power supply. Moreover, it will be appreciated that the action of the latch mechanism can provide an audible indication to a user that the mechanism has properly engaged in the form of a mechanical "click." It will also be appreciated that, similar to the embodiment incorporating visual indication by electronic means, such as using LED's or other indicator lights, the audible indication could also be provided using appropriate switches and an audible annunciator, that might provide a "beep," tone, or other similar sound to indicate proper engagement. Moreover, any of the visual indications could be provided along with any of the audible indications or vice versa if desired.

When it is desired to release display interface 14 from wall interface 12 so as to remove display 40 from wall 26, a user can press downwardly on latch button 48. This will cause sloped surfaces 96 on latch button 48 to slide on rounded surfaces 86, thereby pivoting swing catch 70 rearwardly against the bias of spring 74. Once projection 82 clears recess 84, body portion 42 is released so as to slide upward due to the bias of springs 46, thereby releasing display interface 14 from wall interface 12, and enabling the display 40 to be lifted off and removed from the wall.

Referring now to FIG. 11a, in an alternative embodiment, a separate mounting plate 100 is provided as part of display mount 10. Plate 100 is secured to the wall or other structure with lag bolts 101, and wall interface 12 is then secured to plate 100 by way of PEM studs 102 or threaded fasteners (not depicted). Wall interface 12 can then be leveled by rotating as described above, while plate 100 remains stationary.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative embodiments.

What is claimed is:

1. A mount for an electronic display, comprising:
   a wall interface including a planar body portion having an upwardly directed hook portion projecting therefrom, the wall interface being adapted to attach to a wall of a structure;
   a latch mechanism disposed on the body portion of the wall interface proximate the hook portion, the latch mechanism having a body portion slidably disposed on a back plane, the body portion of the latch mechanism defining a latch portion, the body portion of the latch mechanism selectively slidably shiftable on the back plane between an unlatched position of the latch portion and a latched position of the latch portion, the latch mechanism further comprising a visual indicator for indicating when the latch portion is in the latched position; and
   a display interface comprising a display flange with a downwardly directed hook portion projecting therefrom, the display flange adapted to attach to the electronic display, wherein the downwardly directed hook portion of the display interface is selectively engageable with the upwardly directed hook portion of the wall interface to couple the display interface to the wall interface, and wherein the latch portion of the latch mechanism engages with the downwardly directed hook portion of the display interface to inhibit disengagement of the display interface from the wall interface when the latch portion is shifted to the latched position.

2. The mount of claim 1, wherein the latch mechanism further comprises a biasing spring arranged to bias the latch portion toward the unlatched position, a swing catch operably coupled to the latch portion and arranged to secure the latch portion in the latched position, and a release button operably coupled to the swing catch for releasing the latch portion from the latched position.

3. The mount of claim 2, wherein the release button comprises the visual indicator.

4. The mount of claim 3, wherein the release button is disposed in a first position when the latch portion is in the unlatched position and the release button is disposed in a second position when the latch portion is in the latched position.

5. The mount of claim 1, wherein the latch mechanism provides an audible indication when the latch portion is shifted to the latched position.

6. The mount of claim 1, wherein the planar body portion of the wall interface defines at least one pair of slots adapted to receive fasteners to attach the wall interface to the wall.

7. The mount of claim 6, wherein each one of the at least one pair of slots is disposed at an angle relative to horizontal.

8. The mount of claim 6, wherein the planar body portion of the wall interface defines a plurality of pairs of slots adapted to receive fasteners to attach the wall interface to the wall.

9. The mount of claim 6, wherein each slot of the at least one pair of slots is disposed so as to enable the wall interface to rotate relative to the wall with a separate fastener extending through each slot.

10. An electronic display system, comprising:
    an electronic display; and
    a mount for attaching the electronic display to a wall of a structure, the mount comprising:
      a wall interface including a planar body portion having an upwardly directed hook portion projecting therefrom, the wall interface being adapted to attach to the wall;
      a latch mechanism disposed on the body portion of the wall interface proximate the hook portion, the latch mechanism having a body portion slidably disposed on a back plane, the body portion of the latch mechanism defining a latch portion, the body portion of the latch mechanism selectively slidably shiftable on the back plane between an unlatched position of the latch portion and a latched position of the latch portion, the latch mechanism further comprising a visual indicator for indicating when the latch portion is in the latched position; and
      a display interface comprising a display flange with a downwardly directed hook portion projecting therefrom, the display flange attached to the electronic display, wherein the downwardly directed hook portion of the display interface is selectively engageable with the upwardly directed hook portion of the wall interface to couple the display interface to the wall interface, and wherein the latch portion of the latch mechanism engages with the downwardly directed hook portion of the display interface to inhibit disengagement of the display interface from the wall interface when the latch portion is shifted to the latched position.

11. The system of claim 10, wherein the latch mechanism further comprises a biasing spring arranged to bias the latch portion toward the unlatched position, a swing catch operably coupled to the latch portion and arranged to secure the latch portion in the latched position, and a release button operably coupled to the swing catch for releasing the latch portion from the latched position.

12. The system of claim 11, wherein the release button comprises the visual indicator.

13. The system of claim 12, wherein the release button is disposed in a first position when the latch portion is in the unlatched position and the release button is disposed in a second position when the latch portion is in the latched position.

14. The system of claim 10, wherein the latch mechanism provides an audible indication when the latch portion is shifted to the latched position.

15. The system of claim 10, wherein the planar body portion of the wall interface defines at least one pair of slots adapted to receive fasteners to attach the wall interface to the wall.

16. The system of claim 15, wherein each one of the at least one pair of slots is disposed at an angle relative to horizontal.

17. A mount for an electronic display, comprising:
a wall interface including a planar body portion having an upwardly directed hook portion projecting therefrom, wherein the planar body portion of the wall interface defines at least one pair of slots adapted to receive fasteners to attach the wall interface to a wall of a structure;
a latch mechanism disposed on the body portion of the wall interface proximate the hook portion, the latch mechanism having a body portion slidably disposed on a back plane, the body portion of the latch mechanism defining a latch portion, the body portion of the latch mechanism selectively slidably shiftable on the back plane between an unlatched position of the latch portion and a latched position of the latch portion; and
a display interface comprising a display flange with a downwardly directed hook portion projecting therefrom, the display flange adapted to attach to the electronic display, wherein the downwardly directed hook portion of the display interface is selectively engageable with the upwardly directed hook portion of the wall interface to couple the display interface to the wall interface, and wherein the latch portion of the latch mechanism engages with the downwardly directed hook portion of the display interface to inhibit disengagement of the display interface from the wall interface when the latch portion is shifted to the latched position.

18. The mount of claim 17, wherein each one of the at least one pair of slots is disposed at an angle relative to horizontal.

19. The mount of claim 17, wherein the planar body portion of the wall interface defines a plurality of pairs of slots adapted to receive fasteners to attach the wall interface to the wall.

20. The mount of claim 17, wherein each slot of the at least one pair of slots is disposed so as to enable the wall interface to rotate relative to the wall with a separate fastener extending through each slot.

* * * * *